March 19, 1968     G. S. HIGGINBOTTOM     3,373,599
HEAT TEST APPARATUS

Filed Jan. 27, 1965     2 Sheets-Sheet 1

INVENTOR.
GEORGE S. HIGGINBOTTOM
BY
ATTORNEYS

INVENTOR.
GEORGE S. HIGGINBOTTOM 3,373,599
HEAT TEST APPARATUS
George S. Higginbottom, Matawan, N.J., assignor to the United States of America as represented by the Secretary of the Navy
Filed Jan. 27, 1965, Ser. No. 428,594
4 Claims. (Cl. 73—15)

ABSTRACT OF THE DISCLOSURE

A heat test apparatus is proposed to test planar specimens of textiles, rubber, plastics, metals, wood and finishes by radiating the specimens with infrared radiation. The specimens are located in a double frame which is magnetically attached to upright flanged supports so as to locate the double frame at a spaced distance from a second plate carrying infrared generating means in an opening at its center.

---

The invention described herein may be manufactured and used by or for the Government of the United States of America for governmental purposes without the payment of any royalties thereon or therefor.

This invention relates to improvements in test apparatus. More particularly, this invention relates to an apparatus for use in evaluating the effects of radiant heat on materials.

A need exists for a reliable means of evaluating the degradative effects of radiant heat, as would be experienced from a nuclear explosion, on such things as textiles, rubber, plastics, metals, wood and finishes. There are test apparatus, which may be used to measure the effects of exposure of such things to a radiant heat source, but each is either unreliable, difficult to control, or generally lacks the characteristics that afford reproducibility of measurements made therewith.

For instance, in an apparatus now in use, the radiant heat source is in an electrically heatd carbon rod whose energy is reflected onto the specimen to be tested by a mirror-like, metal reflector mounted in the horizontal plane. The specimen is mounted and centered approximately one and one half inches above the top edges of the reflector and the carbon rod is operated in the range of about 2550° F.

One of the deficiencies encountered in the use of this apparatus results from the use of a reflector to direct the heat energy onto the specimen. The alignment of the reflector to the required curvature is critical, and generally affects reproducibility adversely.

Another difficulty is the presence of localized hot-spots in the rod under use. As is apparent, any variation in regard to temperature becomes a major problem.

Also, such things as dust, dirt, scratches, and distortions influence the results of the test and are a source of potential trouble with respect to reliability.

A principal object of this invention is to provide a heat test apparatus for use in evaluating the effects of infra-red radiant heat.

Another object is to provide a simple, inexpensive, radiant heat test apparatus possessing few variables and affording better duplication of results.

A further object is to provide a heat test apparatus wherein exposure time, exposure distance, and intensity of heat source may be varied and controlled.

A further object is to provide a heat test apparatus of low fabrication and maintenance costs, light weight, high durability and facile in use under a wide variety of service conditions.

Other object and many of the attendant advantages of this invention will be readily appreciated as the same becomes better understood by reference to the following detailed description when considered in connection with the accompanying drawings wherein.

Similar numerals refer to similar parts throughout the several views.

Figure 1:
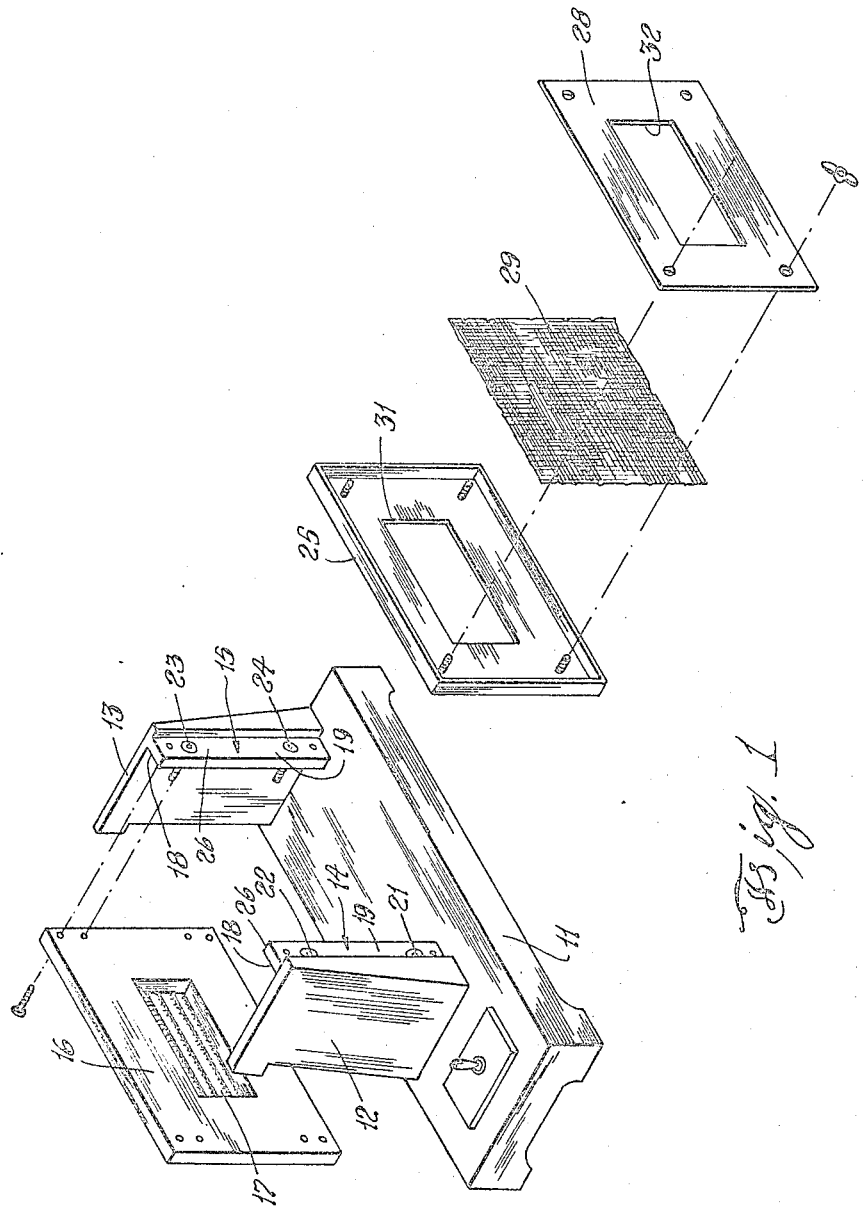
FIG. 1 is an exploded view of the apparatus of this invention.

As shown in FIG. 1, the apparatus is provided with a flat horizontal, cast aluminum base 11 upon which are mounted a pair of vertical uprights 12, 13 transverse to the base. Each of the uprights, on their innermost surface, is provided with a longitudinally vertical flange 14 and 15. A flat smooth finished transite plate or board 16 having a central opening 17 is adapted to be secured to a common side 18 of each of the vertical flanges 14 and 15. The free side 19 or surface of each of the flanges is adapted with magnetic inserts 21, 22, 23 and 24 for separable engagement with the metal frame 25 of the specimen holder to be described. When the specimen holder is mounted on the flange, as described, it is in face to face relation with the transite board 16 with the breadth 26 of each of the flanges 14 and 15 determining the space therebetween.

Figure 2:
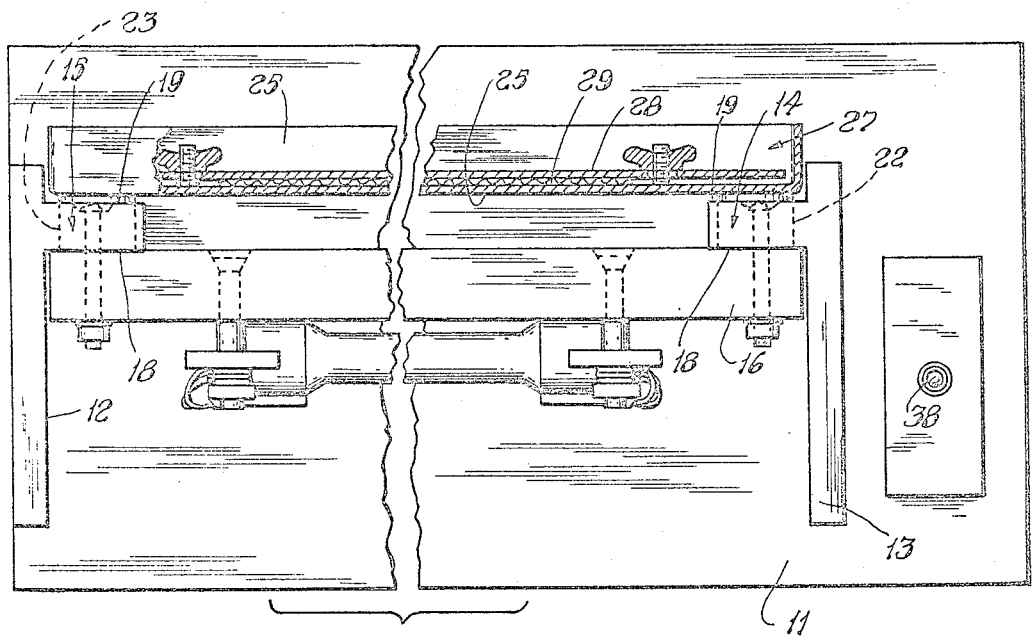
FIG. 2 is a top plan view of the assembled apparatus of FIG. 1.

As shown in FIGS. 1 and 2, the specimen holder consists of dual metal frames 25 and 28, one of which is recessed and the second 28 of which is adapted to be secured to the first 25, with provision for insertion therebetween of matter 29 to be tested. The frames 25 and 28 are each provided with a central opening 31 and 32 in common alignment with each other and with the central opening 17 of the transite board 16.

Figure 3:
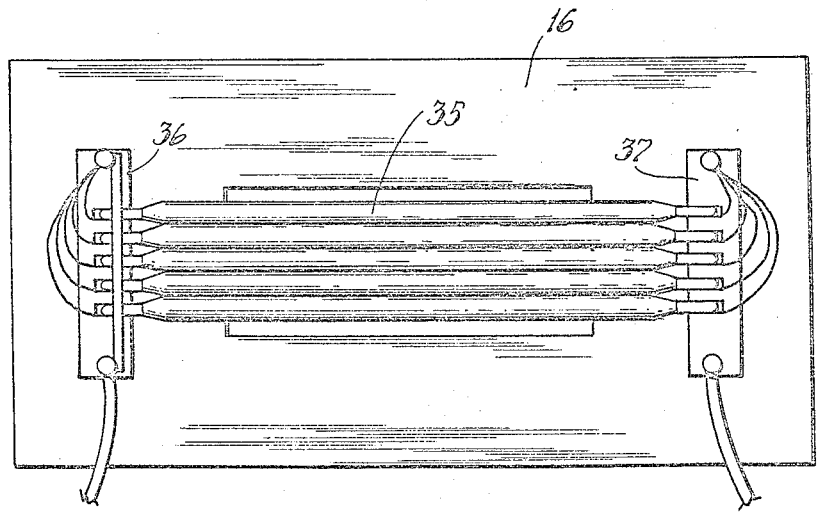
FIG. 3 is a plan view of the heat source of the apparatus set forth in Fig. 1.

An array 35 of five 500 watt infra-red, tubular, translucent, quartz lamps (115–125 volts) are secured over the opening of the transite board as shown in FIG 3. Each of the lamps is secured between two busbars 36 and 37, both of which are wired to a conventional circuit (not shown) having a switch 38 for opening and closing the circuit.

When it is desired to calibrate the apparatus, current is applied to the array of lamps and a powerstat (not shown), which is in circuit with the unit, is adjusted to a selected operating voltage. After the lamps have been on 80 seconds or more, temperature readings are taken of the individual lamps in the array by means of an optical pyrometer. This procedure serves as a means of calibrating the heat source. The temperature of the heat source can then be raised or lowered by adjustment of the powerstat. When the unit achieves the temperature desired, the lamps are shut off and the setting of the powerstat is left undisturbed.

In operation, a test sample of appropriate size is mounted on the frame. The place, which holds the specimen in position, is superimposed on the top of the sample. A wing nut is used to lock the plate to the frame. The unit is then placed in front of the heat source at a preset exposure position. If a metallized fabric is utilized, the specimen is positioned so that the metallized surface is in face to face relation with the heat source. The heat source is turned on and the test sample is exposed for the desired interval of time. After exposure, the effects of the treatment are determined visually for such things as smoking, burning, cracking, blistering, flaking and peeling.

If desired, heat sensitive devices may be placed between the sections of a multilayer specimen or attached to the unexposed side to determine temperature rise. This would include thermocouples, thermistors, calorimeters, skin simulants and sharp melting point temperature indicators. The results of such tests can be interpreted into degree of skin burn.

As is apparent from the foregoing, the test apparatus described is easy to construct, repair and service. The apparatus does not require the use of reflectors, therefore associated problems are eliminated. Further, the specimen under test is held, spaced, and positioned in a uniform manner, thereby affording greater accuracy and greater reproducibility as far as test results are concerned. Also, the test is not limited to textile material but may be used on a wide variety of materials.

It has also been found that the area irradiated by the heat source is elliptical in shape with good spatial uniformity. Therefore, weak areas can easily be determined. Also, the specimens may be evaluated in two positions, either horizontal or vertical, by a mere reposition of the flanges 14 and 15.

Obviously, many modifications and variations of the present apparatus are possible in light of the present teaching. For instance, the heat source holder could be mounted on a swivel to enable various exposure positions to be used. Also, an automatic timer could be installed to regulate the lamps at a preset exposure time. It is therefore to be understood that within the scope of the appended claims, the invention may be practiced otherwise than as described.

I claim:
1. A heat testing apparatus comprising:
    a horizontal base,
    a pair of vertical uprights mounted transversely on said base,
        each of said uprights provided with a vertical flange,
    a flat plate secured to one side of each of said flanges between said uprights,
        said plate provided with a central opening,
    a plurality of heating elements secured to one side of said plate,
        each of said elements traversing said opening in said plate, and
    dual frames, one of which is separably engaged to the other, for insertion therebetween of material to be tested,
        said dual frames, as a unit, being separably secured to the free side of said flange in spaced relation to said plate,
            each of said frames having an opening in common alignment with the opening in said plate.

2. A heat testing apparatus comprising:
    a flat horizontal base,
    a pair of vertical uprights mounted transversely on said base,
        each of said uprights provided with a longitudinally vertical flange,
    a flat plate secured to one side of each of said flanges between said upright,
        said plate provided with a central opening,
    a plurality of heating elements secured to one side of said plate,
        each of said elements traversing said opening in said plate,
    energizing means operatively connected to said heating elements, and
    dual frames, one of which is separably engaged to the other, for insertion therebetween of material to be tested,
        said dual frames, as a unit, being separably engaged to the free side of said flange in spaced relation to said plate,
            each of said frames having an opening in common alignment with the opening in said plate.

3. A heat testing apparatus comprising:
    a flat horizontal base,
    a pair of vertical uprights mounted transversely on said base,
        each of said uprights provided with a longitudinally vertical flange,
            said flange provided with a magnetic insert,
    a flat plate secured to one side of each of said flanges between said uprights,
        said plate provided with a central opening,
    a plurality of infra-red heating elements secured to one side of said plate,
        each of said elements traversing said opening in said plate,
    energizing means operatively connected to said heating elements, and
    dual metal frames, one of which is separably engaged to the other, for insertion therebetween of matter to be tested,
        said dual frames, as a unit, being separably engaged to said magnet on said flange in spaced relation to said plate,
            each of said frames having an opening in common alignment with the opening in said plate.

4. A heat testing apparatus comprising:
    a flat horizontal base,
    a pair of vertical uprights mounted transversely on said base,
        each of said uprights provided with a longitudinally vertical flange,
            one side of said flange provided with a magnetic insert,
    a flat plate secured to the other side of said flange between said uprights,
        said plate being provided with a central opening,
    a plurality of infra-red heating elements secured to one side of said plate,
        each of said heating elements traversing said opening in said plate,
    an electrical power source operatively connected to said heating elements, and
    dual metal frames, one of which is separably engaged to the other, for insertion therebetween of matter to be tested,
        said dual frames, as a unit, being separably engaged to said magnet on said flange in spaced relation to said plate,
            each of said frames having an opening in axial alignment with the opening in said plate.

References Cited
UNITED STATES PATENTS

| | | | |
|---|---|---|---|
| 2,316,378 | 4/1943 | Witham | 73—51 |
| 2,895,327 | 7/1959 | Monego et al. | 73—15 |
| 3,292,418 | 12/1966 | Oehme et al. | 73—15 |

JAMES J. GILL, *Primary Examiner.*

E. SCOTT, *Assistant Examiner.*